United States Patent [19]
Chen et al.

[11] Patent Number: 5,357,372
[45] Date of Patent: Oct. 18, 1994

[54] ULTRA-COMPACT, WIDE FIELD OF VIEW VIRTUAL IMAGE DISPLAY OPTICAL SYSTEM

[75] Inventors: Chungte W. Chen, Irvine; Ronald G. Hegg, Los Angeles, both of Calif.

[73] Assignee: Hughes Aircraft Company, Los Angeles, Calif.

[21] Appl. No.: 864,863

[22] Filed: Apr. 7, 1992

[51] Int. Cl.[5] .............................................. G02B 27/14
[52] U.S. Cl. .................................... 359/637; 359/630; 359/631
[58] Field of Search ................................... 359/15–19, 359/629–641, 362–367, 726–732, 839; 340/705, 905, 980

[56] References Cited

U.S. PATENT DOCUMENTS

| | | | |
|---|---|---|---|
| 3,549,803 | 12/1970 | Becht | 359/839 |
| 3,598,468 | 8/1971 | Perry | 359/364 |
| 3,697,154 | 10/1972 | Johnson | 359/641 |
| 3,723,805 | 3/1973 | Scarpino et al. | 359/637 |
| 3,784,742 | 1/1974 | Burnham et al. | 359/449 |
| 3,940,204 | 2/1976 | Withrington | 359/19 |
| 4,042,957 | 8/1977 | Ellis | 359/630 |
| 4,294,515 | 10/1981 | Kaufmann | 359/634 |
| 4,582,389 | 4/1986 | Wood et al. | 359/631 |
| 4,669,810 | 6/1987 | Wood | 359/19 |
| 4,714,320 | 12/1987 | Banbury | 359/364 |
| 4,729,634 | 3/1988 | Raber | 359/630 |
| 4,740,780 | 4/1988 | Brown et al. | 359/630 |
| 4,799,765 | 1/1989 | Ferrer | 359/631 |
| 4,854,688 | 8/1989 | Hayford et al. | 359/641 |
| 4,927,234 | 5/1990 | Banbury et al. | 359/630 |
| 4,968,123 | 11/1990 | Fournier, Jr. et al. | 359/630 |
| 4,973,139 | 11/1990 | Weinhrauch et al. | 359/630 |
| 5,124,821 | 6/1992 | Antier et al. | 359/630 |

*Primary Examiner*—Loha Ben
*Assistant Examiner*—Thong Nguyen
*Attorney, Agent, or Firm*—Leonard A. Alkov; W. K. Denson-Low

[57] ABSTRACT

A virtual image display (VID) optical system that is very compact and has a wide field of view. The present optical system has good image quality, has simple optics, is very compact, provides wide field coverage, and has very large field overlaying. The system comprises a combiner and a catadioptric relay group disposed along an optical path between a cathode ray tube and an operator. The virtual image display system of the present invention is adapted to enlarge an image of the cathode ray tube viewed by the operator. The catadioptric relay group is typically comprised of a concave mirror and one refractive sub-group with at least one lens, and provides excellent image quality over a very wide field of view. The concave mirror contributes positive optical power to the system, thus providing for a compact optical system. The concave mirror may be tilted and-/or decentered to balance the asymmetric aberrations generated by the combiner. The concave mirror may also have an axially symmetric or generalized surface shape to provide for aberration balance. The concave mirror and combiner cooperate to balance the field curvature introduced by a refractive shape of the relay group. The refractive group of the relay may also be tilted and/or decentered to reduce residual asymmetric aberration.

24 Claims, 2 Drawing Sheets

ULTRA-COMPACT, WIDE FIELD OF VIEW VIRTUAL IMAGE DISPLAY OPTICAL SYSTEM

BACKGROUND

The present invention relates generally to virtual image display systems, and more particularly, to an ultra-compact, wide field of view, virtual image display system.

Virtual image displays (VID), such as head-up displays (HUD) and helmet-mounted displays (HMD), are generally comprised of a combiner and a relay group. The prior art relating to head-up displays is generally classified into two categories: a display having (1) one combiner and an all-refractive relay group or, (2) one combiner and a convex reflective relay group. In case (1), the effects of the asymmetrical geometry of the combiner are undone by the refractive relay. Generally, the image quality is seriously compromised. In case (2), the generic telephoto optical form limits the usable field of view. These deficiencies are overcome by the present invention.

More particularly, relevant prior art relating to head-up displays and helmet mounted displays is discussed below. The drawbacks of these prior an displays are also summarized below.

A typical conventional head-up or helmet mounted display is disclosed in U.S. Pat. No. 3,940,204, entitled "Optical Display Systems Utilizing Holographic Lenses", issued to Withrington. This optical system includes three sub-modules: one holographic combiner, one relay group and one cathode my tube (CRT). The information displayed on the CRT is first relayed by a relay group to form an intermediate image and further relayed by the combiner to a comfortable position in front of a viewer. This optical design form has the following advantages: (1) The relay group allows the size of the CRT to be small. (2) The relay group enlarges the area of the overlay field. (3) The combiner relays the eye box (pupil) inside the relay group, so, therefore the size of the relay group is small.

However, the significant drawback of such an optical system is the large bending angle associated with the combiner. The aberration introduced by the combiner due to the bending of the line-of-sight often limits the image quality and the size of the optical system. To compensate and reduce the aberrations, three design steps have generally been taken: (1) applying tilt and decentration to optical elements of the relay group to provide for aberration compensation; (2) employing anamorphic optical elements such as prisms and cylindrical lenses for aberration balance; (3) reducing the bending angle of the combiner to minimize the aberration introduced by the combiner. Unfortunately, these techniques result in a smaller usable field of view and smaller field overlaying.

Other patents relating to virtual image display systems and related technologies are disclosed in U.S. Pat. No. 4,669,810, entitled "Display System", issued to Wood; U.S. Pat. No. 4,740,780, entitled "Head-Up Display For Automobile", issued to Brown et al.; U.S. Pat. No. 3,697,154, entitled "Optical Viewing System", issued to Johnson; U.S. Pat. No. 3,723,805, entitled "Distortion Correction System", issued to Scarpino et al.; U.S. Pat. No. 4,042,957, entitled "Display Systems", issued to Ellis; U.S. Pat. No. 3,784,742, entitled "Ground-Based Flight Simulating Apparatus", issued to Burnham et al.; U.S. Pat. No. 4,294,515, entitled "Virtual Image Display Apparatus", issued to Kaufman; U.S. Pat. No. 3,549,803, entitled "Virtual Image System For Training Simulator", issued to Bechtet al.; U.S. Pat. No. 4,973,139, entitled "Automotive Head-Up Display", issued to Weihrauch et al.; and European Patent Application No. 229,876, entitled "On-vehicle head up display device", by Yoshiyuki et al.

SUMMARY OF THE INVENTION

In order to overcome the disadvantages of conventional virtual image display systems, the present invention provides for a virtual image display (VID) optical system that is very compact and has a wide field of view when compared to conventional systems. Compared with prior art systems, the optical system constructed according to the present invention has much better image quality, simpler optics, is very compact, provides wide field coverage, and has very large field overlaying. The present invention is also potentially very inexpensive due to the simple optical elements employed therein.

In the present invention, a relay group comprising one concave minor and one refractive sub-group with at least one lens, provides excellent image quality over a very wide field of view. The present optical system also fits in a very compact package. More importantly, a significant cost saving is realized due to the use of a simple relay group.

More particularly, the virtual image display optical system of the present invention is adapted to enlarge an image of a cathode ray tube viewed by an operator. The system comprises a combiner and a catadioptric relay group disposed along an optical path between the cathode ray tube and the operator.

The catadioptric relay group is typically comprised of a concave mirror and at least one lens. The concave mirror contributes positive optical power to the system, thus providing for a compact optical system. The concave mirror may be tilted and/or decentered to balance the asymmetric aberrations generated by the combiner. The concave mirror may have an axially symmetric surface shape or a generalized surface shape to provide for aberration balance. The concave mirror and combiner cooperate to balance the field curvature introduced by a refractive shape of the relay group. The refractive group of the relay is tilted and/or decentered to reduce residual asymmetric aberration.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
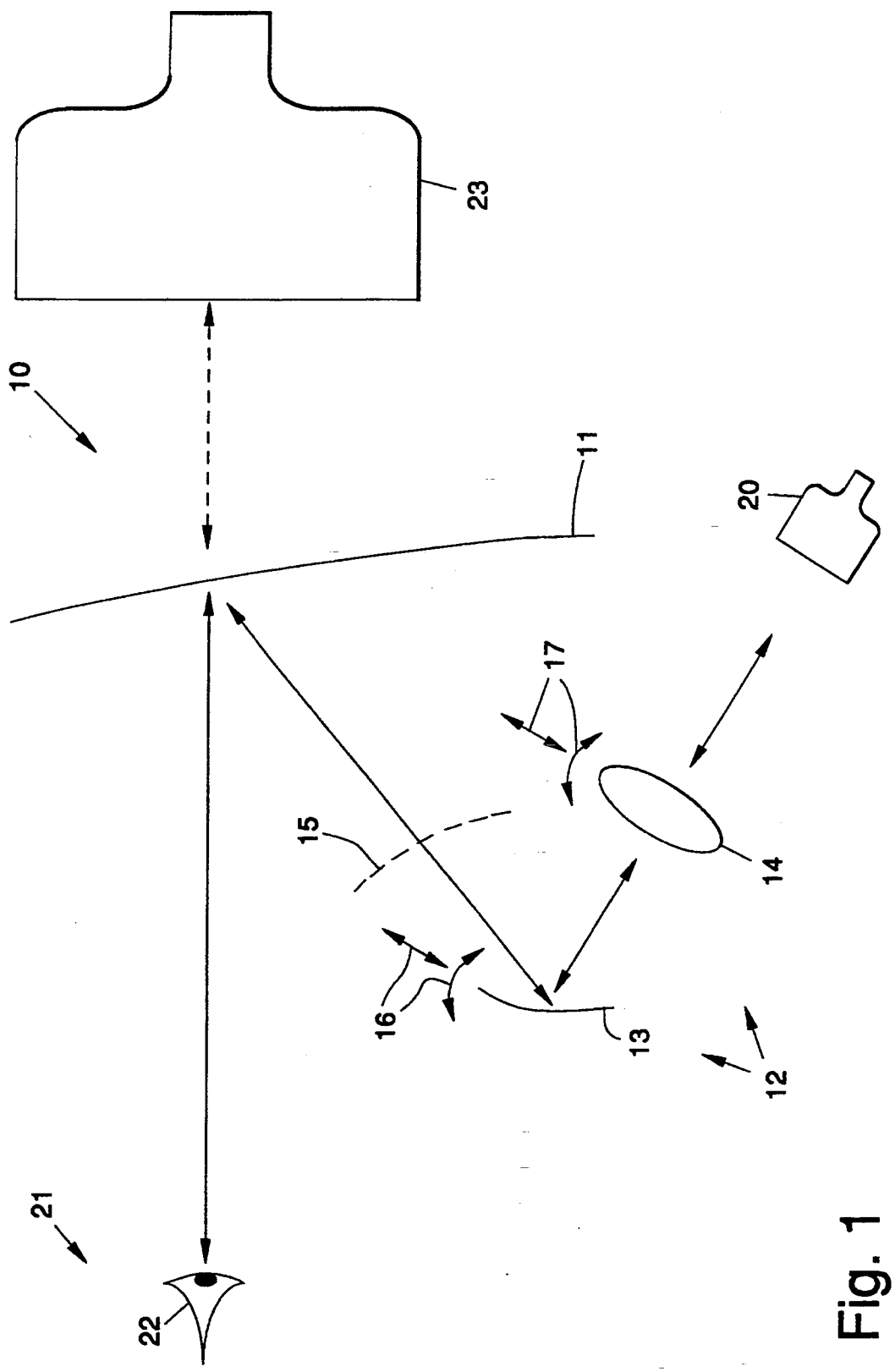
FIG. 1 shows an illustration of an ultra-compact, wide field of view, virtual image display system in accordance with the principles of the present invention.
Figure 2:
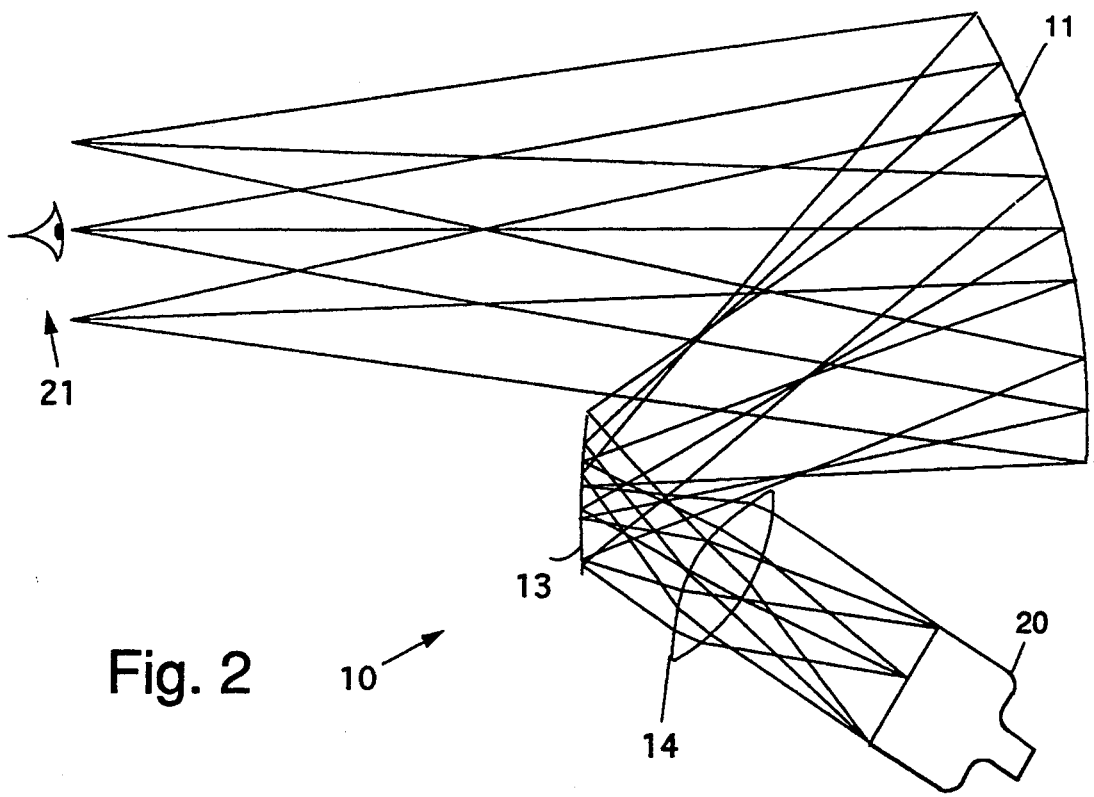
FIG. 2 shows a side view of the optical portion of the virtual image display system of FIG. 1.
Figure 3:
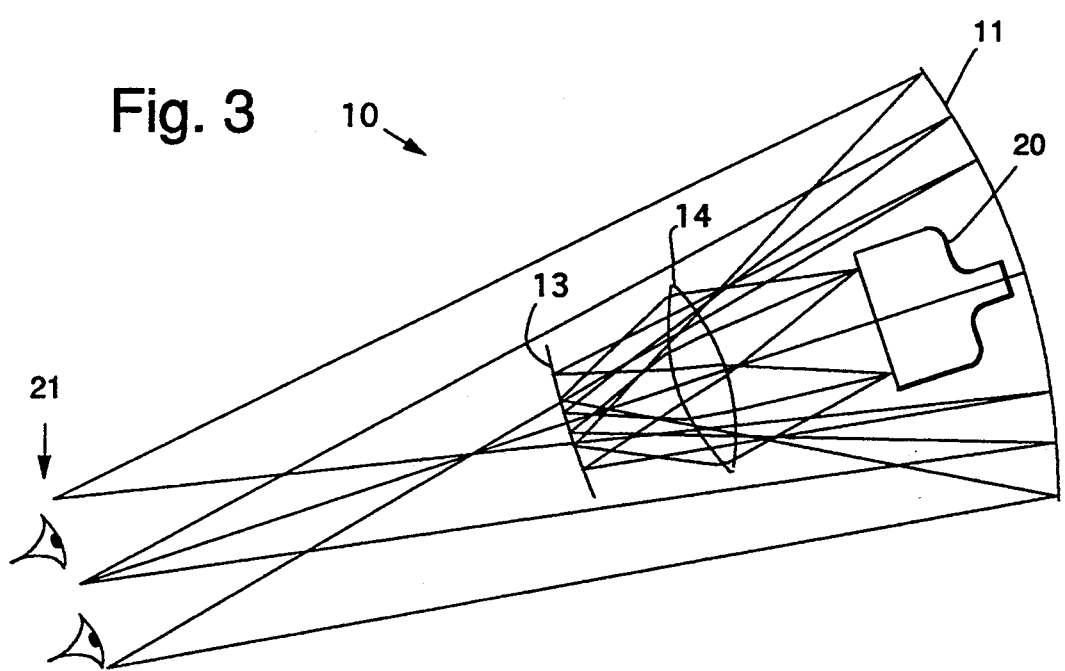
FIG. 3 shows a top view of the optical portion of the virtual image display system of FIG. 1.

The present invention overcomes the deficiencies discussed in the Background section. FIG. 1 shows an illustration of an ultra-compact, wide field of view, virtual image display system 10 in accordance with the principles of the present invention. FIGS. 2 and 3 show side and top views, respectively, the optical portion of the virtual image display system 10 of FIG. 1. The virtual image display system 10 is disposed between a cathode ray tube 20 and an operator 21, such that the operators eyes 22 see a virtual image 23 of the cathode ray tube (CRT) 20.

The optical system 10 comprises two sub-modules, including a combiner 11 and a catadioptric relay group 12. The relay group 12 is a catadioptric system with one concave mirror 13 and at least one relay lens 14. The images displayed on the CRT 20 first passes through the relay lens 14, and are then reimaged by the concave mirror 13 at an intermediate image plane 15. Finally, the combiner 11 relays the image at a comfortable viewing distance in front of the operator eyes 22. The design principles of the catadioptric relay group 12 are summarized below:

Asymmetrical aberrations and distortion resulting from the combiner 11 are primarily compensated for by the concave mirror 13 of the relay group 12. In order to minimize residual aberration of the overall system 10, the concave mirror 13 is tilted and/or decentered. The positive optical power of the concave mirror 13 makes the overall system 10 very compact. The Petzval curvature of the concave mirror 13 balances portion of the Petzval curvature of the relay lens 14. The combination of the combiner 11 and the concave mirror 13 projects the eye box in close proximity to the relay group 12.

The concave mirror 13 is typically configured to have an axially symmetric surface shape to provide for aberration balance. Alternatively, the concave mirror 13 is made to have a generalized surface shape that is configured to provide for aberration balance. The concave mirror 13 may be tilted and/or decentered to reduce residual asymmetric aberration, as is illustrated by arrows 16. The concave mirror 13 and combiner 11 cooperate to balance the field curvature introduced by a shape of the relay lens 14 of the relay group 12. The refractive relay lens 14 of the relay group 12 may be tilted and/or decentered to reduce residual asymmetric aberration, as is illustrated by arrows 17.

The virtual image display optical system 10 constructed according to the teachings of the present invention results in a system having good image quality, simple optics, has wide field coverage and very large field overlaying, and is very compact. The present system 10 is also relatively inexpensive sue to the use of simple optical elements.

FIGS. 2 and 3 show the side and top views of a design example constructed according to the teaching of the present invention described above. Table 1 summarizes the detailed prescription of the optical system 10. The optical system 10 has wide field of view coverage, has very large field overlaying and is very compact. The terms $C_i$ ($C_5$, $C_8$, $C_{10}$, etc. represent the coefficients found in the Zernike polynomial defined below. The thicknesses values of the combiner 11 and the mirror 13 are in units of inches.

TABLE 1

| Element | Radius (in) | Conic constant | Decenter (in) | Tilt (deg) | Thickness |
|---|---|---|---|---|---|
| Combiner | −16.2000 | −1.1560 | 0 | 15.0 | −12.55501 |
| | $C_5 = -0.238523E-2$ | $C_8 = 0.526213E-3$ | | $C_{10} = -0.175038E-4$ | |
| | $C_{11} = 0.257247E-4$ | $C_{12} = 0.815987E-5$ | | $C_{14} = 0.162943E-5$ | |
| | $C_{17} = -0.158314E-5$ | $C_{19} = 0.258717E-6$ | | $C_{21} = 0.271240E-6$ | |
| | $C_{22} = 0.871057E-7$ | | | | |

| Element | Radius (in) | Conic constant | Decenter (in) | Tilt (deg) | Thickness |
|---|---|---|---|---|---|
| Relay mirror | 18.3519 | −14.670 | 0 | −30.0 | 2.835 |
| | $C_5 = 0.175836E-2$ | $C_8 = 0.235507E-2$ | | $C_{10} = 0.279274E-3$ | |
| | $C_{11} = -0.764886E-3$ | $C_{12} = -0.113785E-3$ | | $C_{14} = -0.108931E-4$ | |
| | $C_{17} = 0.558278E-4$ | $C_{19} = -0.437458E-4$ | | $C_{21} = -0.156684E-4$ | |
| | $C_{22} = 0.385348E-5$ | | | | |

| Element | Glass type | Radius of Curvature Front/back | Decenter (in) | Distance/ Thickness | Aperture diameter Front/back (in) |
|---|---|---|---|---|---|
| Refractive element | plastic plexiglass | 3.05134/ −4.24546 | 0.315 | 1.35 | 4.4/4.4 |
| | Front surface conic constant = −2.9291 | | | | |

The Zernike polynomials $$Z(x,y) = \sum_{i=1}^{24} C_i Z_i(x,y)$$

describe an additional surface sag deviated from a conic surface. The non-zero Zernike polynomial terms are listed below.

$Z_5(x,y) = x^2 - y^2$
$Z_8(x,y) = y(x^2 + y^2)$
$Z_{10}(x,y) = y(3x^2 - y^2)$
$Z_{11}(x,y) = (x^2 + y^2)^2$
$Z_{12}(x,y) = x^4 - y^4$
$Z_{14}(x,y) = x^4 - 6x^2 + y^4$
$Z_{17}(x,y) = y(x^2 + y^2)^2$
$Z_{19}(x,y) = 3x^4y + 2x^2y^3 - y^5$
$Z_{21}(x,y) = 5x^4y - 10x^2y^3 + y^5$
$Z_{22}(x,y) = (x^2 + y^2)^3$ where y and x are aperture coordinates of an optical surface in meridional and sagittal planes, respectively; $f(\rho)$ is the grating phase equation of the diffractive optical element the nth grating ring boundary is located where $\rho$ satisfies $f(\rho) = n$; $\rho$ is the radial coordinate; (+) radii have centers to the right; (−) radii have centers to the left; (+) thickness to the right; (+) decenters are up; (+) tilts are counterclockwise and in degrees; decenters are performed before tilts; conic constant $-\epsilon^2 = -(\text{eccentricity})^2$; dimensions are given in inches; reference wavelength = 0.58765 μm; and the spectral range = 0.17 μm.

Thus there has been described a new and improved an ultra-compact, wide field of view, virtual image display system. It is to be understood that the above-described embodiment is merely illustrative of some of

What is claimed is:

1. A virtual image display optical system for enlarging an image of an image source viewed by an operator, said system comprising:
a combiner and a relay group disposed along an optical path between the image source and the operator, wherein the relay group is comprised of a concave mirror and at least one refractive lens; and
wherein an intermediate image is formed between the combiner and concave mirror, and wherein the concave mirror is tilted to balance the asymmetric aberrations generated by the combiner.

2. The virtual image display optical system of claim 1 wherein the concave mirror contributes positive optical power to the system, thus providing for a compact optical system.

3. The virtual image display optical system of claim 1 wherein the concave mirror has an axially symmetric surface shape to provide for aberration balance.

4. The virtual image display optical system of claim 1 wherein the concave mirror has a generalized surface shape that is configured to provide for aberration balance.

5. The virtual image display optical system of claim 1 wherein the concave mirror and combiner cooperate to balance the field curvature introduced by the refractive lens of the relay group.

6. The virtual image display optical system of claim 1 wherein the refractive lens of the relay group is tilted to reduce residual asymmetric aberration.

7. The virtual image display optical system of claim 1 wherein the refractive lens of the relay group is decentered to reduce residual asymmetric aberration.

8. The virtual image display optical system of claim 1 wherein the refractive lens of the relay group is tilted and decentered to reduce residual asymmetric aberration.

9. A virtual image display optical system for enlarging an image of an image source viewed by an operator, said system comprising:
a combiner and a relay group disposed along an optical path between the image source and the operator, wherein the relay group is comprised of a concave mirror and at least one refractive lens; and
wherein an intermediate image is formed between the combiner and concave mirror, and wherein the concave mirror is decentered to balance the asymmetric aberrations generated by the combiner.

10. The virtual image display optical system of claim 9 wherein the concave mirror contributes positive optical power to the system, thus providing for a compact optical system.

11. The virtual image display optical system of claim 9 wherein the concave mirror has an axially symmetric surface shape to provide for aberration balance.

12. The virtual image display optical system of claim 9 wherein the concave mirror has a generalized surface shape that is configured to provide for aberration balance.

13. The virtual image display optical system of claim 9 wherein the concave mirror and combiner cooperate to balance the field curvature introduced by the refractive lens of the relay group.

14. The virtual image display optical system of claim 9 wherein the refractive lens of the relay group is tilted to reduce residual asymmetric aberration.

15. The virtual image display optical system of claim 9 wherein the refractive lens of the relay group is decentered to reduce residual asymmetric aberration.

16. The virtual image display optical system of claim 9 wherein the refractive lens of the relay group is tilted and decentered to reduce residual asymmetric aberration.

17. A virtual image display optical system for enlarging an image of an image source viewed by an operator, said system comprising:
a combiner and a relay group disposed along an optical path between the image source and the operator, wherein the relay group is comprised of a concave mirror and at least one refractive lens; and
wherein an intermediate image is formed between the combiner and concave mirror, and wherein the concave mirror is tilted and decentered to balance the asymmetric aberrations generated by the combiner.

18. The virtual image display optical system of claim 17 wherein the concave mirror contributes positive optical power to the system, thus providing for a compact optical system.

19. The virtual image display optical system of claim 17 wherein the concave mirror has an axially symmetric surface shape to provide for aberration balance.

20. The virtual mage display optical system of claim 17 wherein the concave mirror has a generalized surface shape that is configured to provide for aberration balance.

21. The virtual image display optical system of claim 17 wherein the concave mirror and combiner cooperate to balance the field curvature introduced by the refractive lens of the relay group.

22. The virtual image display optical system of claim 17 wherein the refractive lens of the relay group is tilted to reduce residual asymmetric aberration.

23. The virtual image display optical system of claim 17 wherein the refractive lens of the relay group is decentered to reduce residual asymmetric aberration.

24. The virtual image display opticla system of claim 17 wherein the refractive lens of the relay group is tilted and decentered to reduce residual asymmetric aberration.

* * * * *